United States Patent
Wakamatsu

[11] Patent Number: 5,995,381
[45] Date of Patent: Nov. 30, 1999

[54] PULSE WIDTH MODULATION CONTROLLED SWITCHING REGULATOR

[75] Inventor: Ikuo Wakamatsu, Kanagawa, Japan

[73] Assignee: Media Technology Corporation, Kanagawa, Japan

[21] Appl. No.: 09/102,662

[22] Filed: Jun. 23, 1998

[30] Foreign Application Priority Data

Jul. 8, 1997 [JP] Japan ................................ 9-197733

[51] Int. Cl.[6] ......................... H02M 3/335; H02M 1/12; H02M 1/02
[52] U.S. Cl. ............................ 363/16; 363/41; 363/26; 363/133
[58] Field of Search .......................... 363/16, 17, 40, 363/41, 24, 25, 26, 131, 132, 133, 134, 98

[56] References Cited

U.S. PATENT DOCUMENTS

| | | | |
|---|---|---|---|
| 5,347,444 | 9/1994 | Takada et al. | 363/98 |
| 5,671,130 | 9/1997 | Kerkman et al. | 363/41 |
| 5,684,680 | 11/1997 | Tahhan et al. | 363/26 |
| 5,825,103 | 10/1998 | Lee | 363/23 |
| 5,859,519 | 1/1999 | Archer | 363/41 |

*Primary Examiner*—Peter S. Wong
*Assistant Examiner*—Bao Q. Vu
*Attorney, Agent, or Firm*—Greenblum & Bernstein, P.L.C.

[57] ABSTRACT

A switching regulator with its less ripples, less switching loss, and low noise, which is capable of being miniaturized with high efficiency is provided. PWM control signals outputted from a terminal T6 of a pulse width control circuit IC1 are inputted to delay circuits DLa and DLb, respectively. The PWM control signal inputted to the delay circuit DLa, only a rise of which is delayed by a resistor Ra and a capacitor Ca, is applied to a gate of FET Q2 via a wave shaping circuit IC2. On the other hand, the PWM control signal inputted to a delay circuit DLb, only a fall of which is delayed by the resistor Rb and the capacitor Cb, is inverted via a wave shaping circuit IC2 and is applied to a gate of FET Q1 as an inverted control signal. Therefore, FETs Q1 and Q2 are turned ON/OFF in a predetermined period, and a pause period where FETs Q1 and Q2 are turned OFF is only a delayed constant period.

6 Claims, 4 Drawing Sheets

PULSE WIDTH MODULATION CONTROLLED SWITCHING REGULATOR

BACKGROUND OF THE INVENTION

1. Field of the Invention

The present invention relates to a switching regulator, and more particularly to a pulse modulation controlled switching regulator capable of miniaturized with high efficiency.

2. Description of the Prior Art

Conventionally, a switching regulator is indispensable as an DC-CD converter of a mobile or a portable device using a power source of communication equipment that often uses a direct current power source or a direct current power supply of dry batteries, storage batteries or the like.

In FIG. 5, there is shown an example of a general switching regulator. This switching regulator employs a pulse width modulation (PWM) controlled half bridge system in which a load voltage can be stabilized or changed by varying a pulse width, i.e., conducting period at a fixed frequency. In FIG. 5, a pulse width control circuit 21 inputs a PWM control signal to a switching elements SW1 and SW2 such as transistor, FET or the like and performs ON-OFF control of the switching elements SW1 and SW2.

When the switching element SW1 is turned ON while the switching element SW2 is OFF, a current from an input voltage Vin flows an inductor L21 on a primary side of a transformer T and a capacitor 20, excites an inductive voltage at an inductor L22 on a secondary side, is voltage-converted, and flows a rectifying and smoothing circuit 20.

In a next period, the switching element SW1 is OFF. When the switching element SW2 is turned ON, a current energy accumulated in the inductor L21 by the stored voltage of the capacitor C20 flows via this switching element SW2. The current energy accumulated in the inductor L21 is conveyed to the inductor L22 and flows the rectifying and smoothing circuit 20. The voltage and current smoothened by the rectifying and smoothing circuit 20 are outputted as an output voltage Vout.

The output voltage Vout is detected by a detecting circuit (not shown), and the detection result is fed back and inputted to the pulse modulation circuit 21. The pulse width control circuit 21 properly controls the conducting time of the switching elements SW1 and SW2, i.e., a pulse width, based on this feedback input and stabilizes the output voltage Vout. Here, a coil T is employed so that the input voltage Vin and the output voltage Vout are insulated from each other.

However, in the conventional PWM controlled half bridge switching regulator shown in FIG. 5, two switching elements are employed, and the time when a current flows while each switching element is ON or OFF and the time when a voltage is applied are partially overlapped. Therefore, there has been a problem that a switching loss occurs resulting in heat generation and noise generation from the switching elements.

Further, in the case where an ON period of the PWM control signal is short, and OFF period thereof is long, for example, in the case where a duty cycle during ON period is 10%, there has been another problem that it becomes difficult to smoothen a voltage or a current during the short ON period, a ripple increases, and an inductor and a capacitor of the rectifying circuit must be inevitably increased to decrease this ripple.

SUMMARY OF THE INVENTION

In the view of the foregoing, it is one of the objects of the present invention to provide a switching regulator capable of suppress a ripple without increasing the size of the inductor and the capacitor of the smoothing circuit and capable of being miniaturized with a small switching loss, reduced noise, and high efficiency.

According to an aspect of the present invention there is provided a switching regulator having first and second switches connected in series between input voltage terminals, and employing a pulse width modulation controlled fly-back system of connecting a series connection of a primary coil of a voltage conversion transformer and capacitor in parallel to the second switch, performing switching control for turning ON/OFF the first and second switches alternately based on a pulse width modulation control signal, and constantly supplying an output voltage smoothened via a secondary coil of the voltage conversion transformer, such switching regulator comprising:

a first directional delay circuit for generating a first pulse signal in which a pulse rise or leading edge of the pulse width modulation control signal is delayed for a predetermined period; and a secondary directional delay circuit for generating the second pulse signal in which a pulse fall or trailing edge of the pulse width modulation control signal is delayed for a predetermined period and inverted, the first pulse signal being a switching control signal for the first switch and the second pulse signal being a switching control signal for the second switch.

According to another aspect of the present invention there is provided a switching regulator, wherein the first directional delay circuit in the above invention comprising:

a first diode for inhibiting conduction in a rising direction of the pulse width modulation control signal; and a first delay circuit connected in parallel to said first diode for delaying a pulse rise of the pulse width modulation control signal for a predetermined period, wherein the second directional delay circuit includes a second diode for inhibiting conduction in a falling direction of the pulse width modulation control signal, a second delay circuit connected in parallel to the second diode for delaying a pulse fall of the pulse width modulation control signal for a predetermined period, and an inverting circuit for inverting a signal outputted from a parallel connection of the second diode and the second delay circuit.

According to still another aspect of the present invention there is provided a switching regulator, wherein said first delay circuit has a first wave shaping circuit for shaping the pulse width modulation control signal to a rectangular pulse signal whose rising edge is delayed for a predetermined period from said pulse rise point to a point whose voltage level corresponds to a predetermined voltage of a signal delayed along with said pulse rise by CR time constant, and wherein said second delay circuit has a second wave shaping circuit for shaping the pulse width modulation control signal to a rectangular pulse signal whose falling edge is delayed for a predetermined period from said pulse fall point to a point whose voltage level corresponds to a predetermined voltage of a signal delayed along with said pulse fall by CR time constant.

According to a further aspect of the present invention there is provided a switching regulator, wherein said predetermined period is a period wherein a rise and a fall of a signal in said first switch based on first pulse signal and a rise and a fall of a signal in said second switch based on said second pulse signal do not mutually overlap in consideration of pulse wave rounding.

According to a still further aspect of the present invention there is provided a switching regulator, wherein the pulse width modulation control signal has a duty cycle of 50% or less.

BRIEF DESCRIPTION OF THE DRAWINGS

These and other objects of the present invention will become clear from the following description with reference to the accompanying drawing, wherein.

PREFERRED EMBODIMENTS OF THE INVENTION

Preferred embodiments of the present invention will now be described with reference to the drawings.

Figure 1:
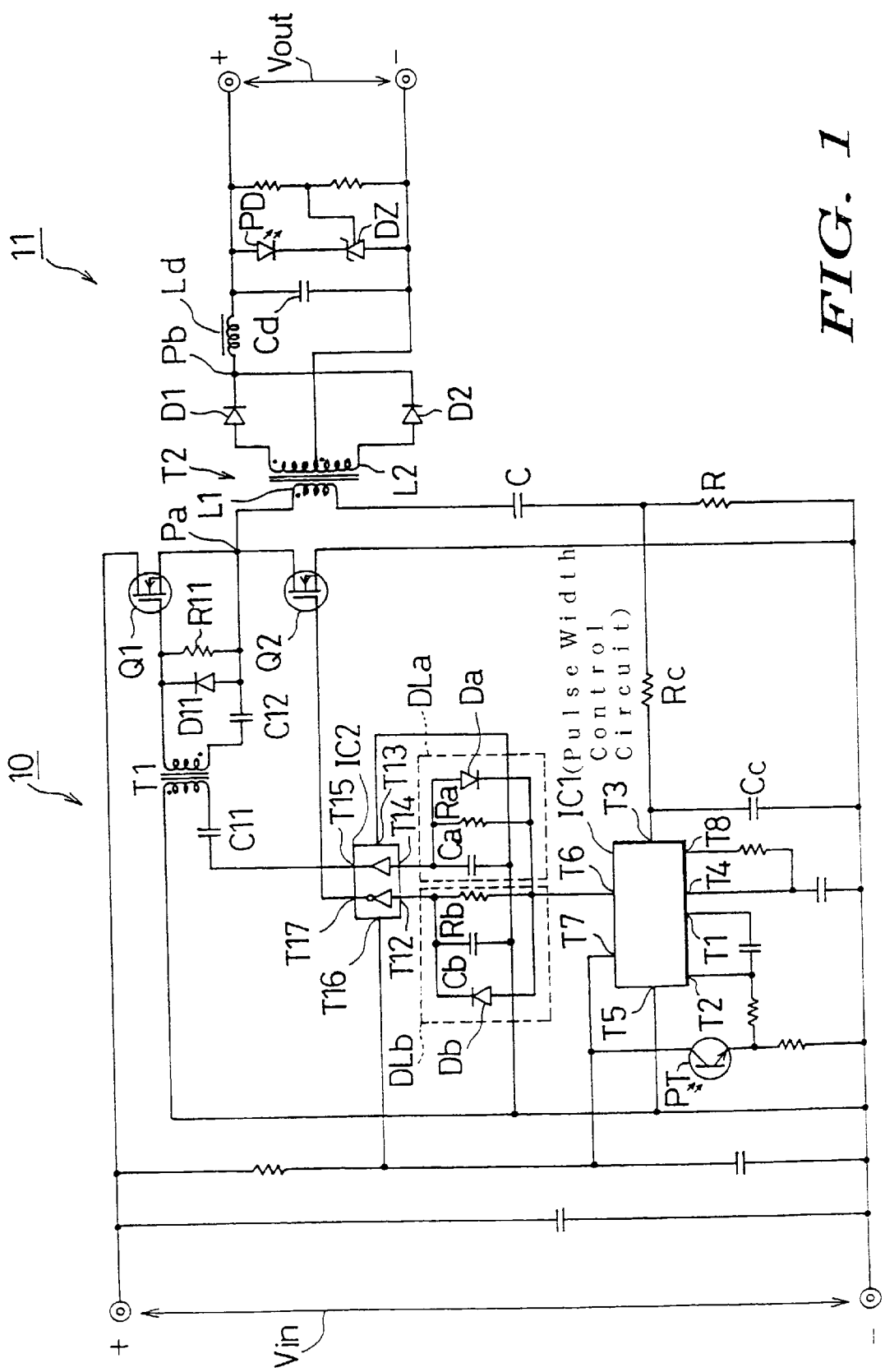
FIG. 1 is a block diagram showing a configuration of a switching regulator using a half bridge pulse width control system associated with one embodiment of the present invention.

FIG. 1 is a block diagram configuring a switching regulator according to one embodiment of the present invention. In FIG. 1, this switching regulator includes a pulse width control unit 10 that functions as a so called half bridge pulse width control switching power source and pulse-width controls an input voltage Vin with such a half bridge configuration and a rectifying and smoothing circuit 11 for an output voltage Vout and is coupled via a transformer T2 for performing voltage conversion. The pulse width control unit 10 basically switches a direct current input voltage Vin by pulse width controlling, generates a high-frequency signal where a conducting period was controlled. The rectifying and smoothing circuit 11 rectifies and smoothens a high-frequency signal voltage-converted via the transformer T2 and outputs a stable direct current output voltage Vout.

For the pulse width control unit 10, FETs (Field Effect Transistors) Q1 and Q2 are connected in series as switching elements between terminals of the input voltage Vin, and these FETs Q1 and Q2 are turned ON/OFF by a pulse signal based on a PWM control signal to be outputted from a pulse width control circuit IC1. Further, from a connection point between a drain of FET Q1 and a source of FET Q2, the primary inductor L1 and a capacitor C of the transformer T2 are connected in series, thereby forming a fly-back configuration, and a resistor R for current detection is connected in series. These inductor L1, capacitor C, and resistor R connected in series are connected in parallel to FET Q2.

The pulse width control circuit IC1 is recently integrally circuited. Here, a Mycrel supplied MIC38C45 model is employed. The pulse width control circuit IC1 receives an output voltage control signal from a light emitting diode PD of the rectifying and smoothing circuit 11 by a light detection photo-transistor PT, performs feedback controlled pulse width control via terminals T1 and T2 and stabilizes an output voltage. A voltage corresponding to a current value flowing a current detection resistor R is inputted to a terminal T3 via a resistor Rc and a capacitor Cc, and over-current protection that minimizes a pulse width in case of over-current is performed. The PWM control signal thus pulse-width controlled is outputted from a terminal T6, inputted to delay circuits DLa and DLb, and further inputted to a wave shaping circuit IC2.

In the delay circuit DLa, a diode Da for inhibiting a current from the pulse width control circuit IC1 to the wave shaping circuit IC2 and for conducting only a current from the wave shaping circuit IC2 to the pulse width control circuit IC1, and a resistor Ra are connected in parallel and connected between a terminal T6 of IC1 and a terminal 14 of IC2, and a capacitor Ca is connected between the terminal 14 and a grounding terminal T13 of the shaping circuit IC2. That is, in the delay circuit DLa, the delay portion due to a CR time constant based on a value between the resistor Ra and the capacitor Ca, and the diode Da are connected between the terminal T6 of the pulse width control circuit IC1 and the terminal T14 of the wave shaping circuit IC2. Consequently, a pulse rise or leading edge of the PWM control signal outputted from the terminal T6 forms a delayed wave form in accordance with the CR time constant based on the value between the resistor Ra and the capacitor Ca, is inputted to the terminal T14 of the wave shaping circuit IC2. A pulse fall or trailing edge of the PWM control signal outputted from the terminal T6 is inputted as is to the terminal T14 of the wave shaping circuit IC2 via the diode Da without any delay.

On the other hand, a delay circuit DLb includes a diode Db in a conducting direction different from that of the diode Da of the delay circuit DLa. The circuit DLb is connected to a terminal T12 of the wave shaping circuit IC2. That is, in the delay circuit DLb, the delay portion due to the CR time constant based on a value between the resistor Rb and the capacitor Cb, and the diode Db are connected between the terminal T6 of the pulse width control circuit IC1 and the terminal T12 of the wave shaping circuit IC2. Consequently, unlike the delay circuit DLa, the pulse rise or leading edge of the PWM control signal outputted from the terminal T6 is inputted as is to the terminal T12 of the wave shaping circuit IC2 via the diode Db without any delay. The pulse fall or trailing edge of the PWM control signal outputted from the terminal T6 forms a delayed wave form in accordance with the CR time constant based on the value between the resistor Rb and the capacitor Cb and is inputted to the terminal T12 of the wave shaping circuit IC2.

The wave shaping circuit IC2 wave-shapes PWM control signals inputted from the terminals T14 and T12, which PWM control signals are delayed by the CR time constant. The wave shaping circuit IC2 thereby generates rectangular pulse signals delayed for a predetermined period from during pulse rise or fall. That is, the PWM control signal inputted from the terminal T14, the pulse rise of which is rounded off by the CR time constant, is wave-shaped to a rectangular pulse signal having a sharp pulse rise after a predetermined elapse of time until the pulse rise has reached a predetermined voltage and is applied to a gate of FET Q1 via the capacitor C11 and the transformer T1. A pulse fall point of the PWM control signal inputted from the terminal 14 is left as is. As a result, the pulse signal to be applied to the gate of FET Q1 becomes a pulse where a pulse rise point of the PWM control signal outputted from the terminal T6 of the pulse width control circuit IC1 is delayed for a predetermined period. To the gate of FET Q1, an AC coupling circuit consisting of a bias resistor R11, a diode D11, and a capacitor C12 is connected between the gate and the drain via the transformer T1. The diode D11 is provided for rapidly escape a gate charge when FET Q1 is OFF and making a fall steep.

On the other hand, the PWM control signal inputted from the terminal T12, the pulse fall of which is rounded off by the CR time constant, is wave-shaped to a rectangular pulse signal having a sharp pulse fall after a predetermined elapse of time until the pulse fall has reaches a predetermined voltage. The wave-shaped pulse is inverted and applied to a gate of FET Q2 from the terminal T17. As a result, the pulse signal to be applied to the gate of FET Q2 becomes an inverted pulse where a pulse fall point of the PWM control signal outputted from the terminal T6 of the pulse control circuit IC1 is delayed for a predetermined period, and the starting time of the OFF period of the PWM control signal is delayed for a predetermined period.

Consequently, since this predetermined period isolates an ON period between FET Q1 and FET Q2, an overlapped portion between a current and a voltage is eliminated, and a switching loss can be reduced. This predetermined period is set in consideration of rounding of the rise and fall of a current and a voltage of switching of each FET, and so on.

When FET Q2 is in OFF state, if FET Q1 is turned ON, the input voltage Vin is applied to the inductor L1, capacitor C, and resistor R, and a current energy flowing the inductor L1 is voltage-converted and conveyed to the secondary inductor L2 of the transformer T2 and is outputted via the diode D1. After FET Q1 has been turned OFF, if FET Q2 is turned ON, the current energy accumulated in the inductor L1 by the voltage energy accumulated by the capacitor C is voltage-converted, conveyed into the secondary inductor L2, and is outputted via the diode D2. A voltage outputted via the diodes D1 and D2 is smoothened by the inductor Ld and the capacitor Cd and outputted as a stable output voltage Vout.

Hereinafter, a description of operation of the circuit in FIG. 1 will be given in more detail with reference to a timing chart of FIG. 2.

Figure 2:
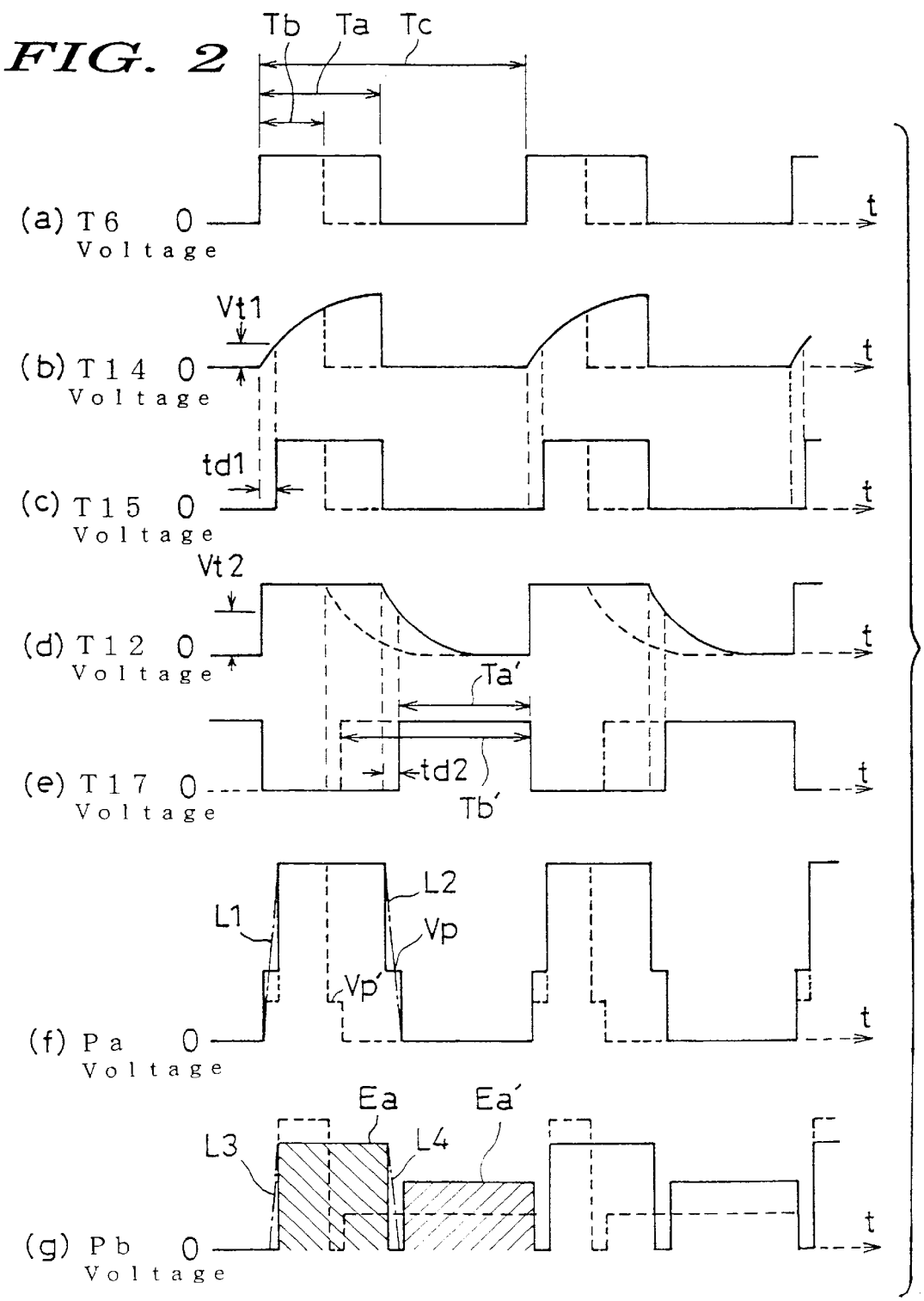
FIGS. 2(a)–2(g) are wave diagrams showing signals of each portion for explaining operation of the switching regulator.

In FIG. 2 (a), there is shown waves of a PWM control signal outputted from the terminal T6 of the pulse control circuit IC1. In FIG. 2 (a), a period Tc denotes a period of a fixed frequency, and a period Ta denotes an ON period of the PWM control signal. This period Ta is adjusted by the pulse width control circuit IC1, however, the value corresponds to a duty cycle of 50% at maximum. The period Ta in FIG. 2 (a) denotes a state corresponding to a duty cycle of about 45%.

In FIG. 2 (b), there is shown a wave to be inputted to the terminal T14 via the delay circuit DLa. For the PWM control signal shown in FIG. 2 (a), the rise wave edge is delayed depending on the CR time constant to be determined by the resistor Ra and the capacitor Ca of the delay circuit DLa.

In FIG. 2 (c), there is shown an output wave from the terminal T15 that is wave-shaped to a pulse signal whose rising edge coincides the time when the voltage level of a rise wave shown in FIG. 2 (b) becomes a predetermined voltage Vt1. Consequently, a pulse rise of the signal of period Ta is delayed by period td1 and is wave-trimmed to a pulse signal having a reduced ON period where the period Ta is reduced by the period td1. This pulse signal is applied to a gate of FET Q1.

On the other hand, in FIG. 2 (d), there is shown a wave inputted to the terminal T12 via the delay circuit DLb. For the PWM control signal shown in FIG. 2 (d), the fall wave edge is delayed by the CR time constant determined by the resistor Rb and capacitor Cb of the delay circuit DLb.

In FIG. 2 (e), there is shown an output wave from the terminal T17. The fall wave edge of a wave form shown in FIG. 2 (d) is delayed by a pulse fall period td2. This is further inverted by the wave shaping circuit IC2, thereby the rising edge of the ON period of the signal shown in FIG. 2 (e) is delayed by the period td2 and is wave-trimmed to a pulse signal having a reduced ON period Ta' where this ON period is shortened by the period td2. This pulse signal is applied to the gate of FET Q2.

Thus, between the pulse signals to be applied to FET Q1 and FET Q2, an off period of the period td1 or td2 always exists, and these pulse signals is securely separated from each other.

In FIG. 2 (f), there is shown a voltage wave at a connection point Pa of FET Q1, FET Q2, and the inductor L1. A potential of the connection point Pa varies depending on the scale of the conducting period of FET Q1. Initially, the voltage wave at the connection point Pa forms a voltage wave corresponding to the wave of the pulse to be applied to the gate of FET Q1 as shown in FIG. 2 (c). The potential of the connection point Pa increases with a rise of the voltage across the capacitor C, and a potential Vp is obtained when FET Q1 is OFF. Thereafter, a reverse voltage wave corresponding to the wave of the pulse applied to the gate of FET Q2 after the period td2 is formed from the potential Vp. After a current energy accumulated by the inductor L1 is transmitted, along with the discharge of the capacitor C, to the smoothing circuit 11, the potential of the connection point Pa becomes the voltage Vp again.

In FIG. 2 (g), there is shown a wave of a voltage after rectified at the connection point Pb of the diodes D1 and D2 on the side of the smoothing circuit 11. A voltage induced into the inductor L2 on the side of the smoothing circuit 11 is full wave rectified. At the connection point Pb, a rectangular wave having areas Ea and Ea' corresponding to energy transmission when FET Q1 is ON and to energy transmission when FET Q2 is ON, respectively, is formed. When FET Q2 is ON, the current energy accumulated by the inductor L1 when FET Q1 is ON is so-called flown back and transmitted to the smoothing circuit 11 side. Consequently, the energy to be transmitted by the area Ea is identical to that to be transmitted by the area Ea'. Two areas indicated by hatching in FIG. 2 (g) are equal to each other.

When attention is paid to a wave at the connection point Pb shown in FIG. 2 (g), a gap in each of the periods td1 and td2 caused by the above mentioned delay is provided between the voltage waves corresponding to those when FET Q1 and FET Q2 are ON. However, a substantially continuous voltage wave is generated by influence of a load, the inductor of the transformer T2 and capacitor. Therefore, since a period in which the voltage wave of the connection point Pb is lowered to a zero voltage is very short or almost zero, a great ripple in smoothing process using the inductor Ld and the capacitor Cd is hardly generated. Because of a small ripple, there is no need for employing the inductor Ld and the capacitor Cd having the greater values to decrease such ripple. As a result, the smoothing circuit 11 can be miniaturized.

Dashed lines shown in FIG. 2 (a) to FIG. 2 (g) indicate cases when duties of the PWM control signals are decreased to about 25%. The energy to be transmitted via the transformer T2 corresponds to the ON period of FET Q1. Referring to FIG. 2 (g), even in the case where such PWN control signal duties are varied, there is provided only a gap having duration corresponding to delay periods td1 and td2, and a substantially continuous voltage wave is formed.

Consequently, even if the duty cycle of PWM control signal is varied, a ripple fails to increase significantly and can be smoothened by the inductor Ld and the capacitor Cd having their small values.

In the conventional half bridge pulse width controlling system, a voltage wave only in the area Ea shown in FIG. 2 (g) has been formed every period Tc, and energy transmission has not been performed in a period corresponding to the area Ea'. That is, FET Q1 ON and FET Q2 ON have been repeatedly performed every period Tc, a voltage wave only in the area Ea has been formed every period Tc, and a period corresponding to the area Ea' has been a pause period. In this case, in the conventional half bridge pulse width controlling system, the PWM control signal duty can be changed to 90% through 95%, however, when the duty is 10%, for instance, about 90% of the period Tc becomes a pause period. This pause period excites resonance as shown above and brings an increase in ripples. In an aspect of this embodiment, however, this resonance becomes very small because of very small periods td1 and td2. In view of this point, ripples will further decrease extremely.

In FIG. 2, since a gap between the periods td1 and td2 is rounded off by a load in an actual circuit, it is necessary to set the period td1 and td2 in consideration of that point. For instance, in FIG. 2 (f), a step is generated in the potential Vp. However, actually, as indicated by dashed line, waves having their slightly smooth rise and fall are generated by a load of the inductor L1 or the like. As shown in FIG. 2 (g), with respect to the voltage wave at the connection point Pb, the periods td1 and td2 are not completely paused and is set so as to form V-letter shape. Thereby, an overlap of the switching voltage and current can be prevented, and continuity of voltage waves can be maintained.

Figure 3:
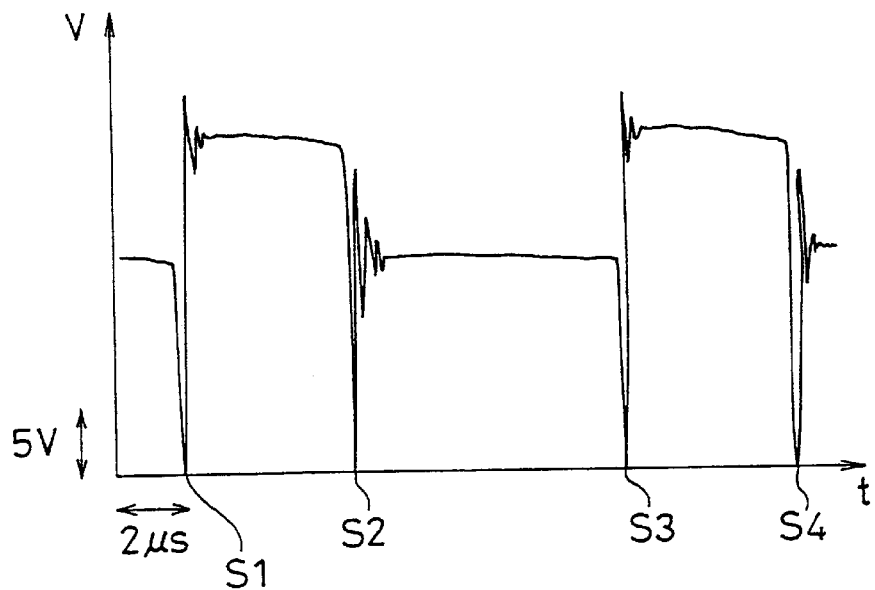
FIG. 3 is a wave diagram showing an actual voltage wave in a connection point Pb of a rectifying and smoothing circuit 11 in the switching regulator of FIG. 1.

In FIG. 3, there is shown an actual voltage wave at the connection point Pb. In FIG. 3, there is shown a V-letter shape in which a potential is zero at points corresponding to the periods td1 and td2, i.e., S1 to S4. Because of its short pause period, resonance at the subsequent rise is very low, and ripples can be restrained.

A description of feedback control of an output voltage will be given here. A varying load is connected to the output voltage Vout from the smoothing circuit 11 in FIG. 1. By using a shunt regulator ZD connected in parallel to this output voltage Vout, a duty cycle of the PWM control signal in the pulse width control circuit IC1 is controlled. The shunt regulator DZ includes a reference voltage source using Zenar diode or the like and a constant voltage regulator circuit. A current flowing this constant voltage regulator circuit is detected by the light emitting diode PD and outputted to a light detecting transistor PT. The light emitting diode PD and the light detecting transistor PT forms a so-called photo-coupler and maintains insulation between the pulse with control unit 10 and the rectifying and smoothing circuit 11.

Figure 4:
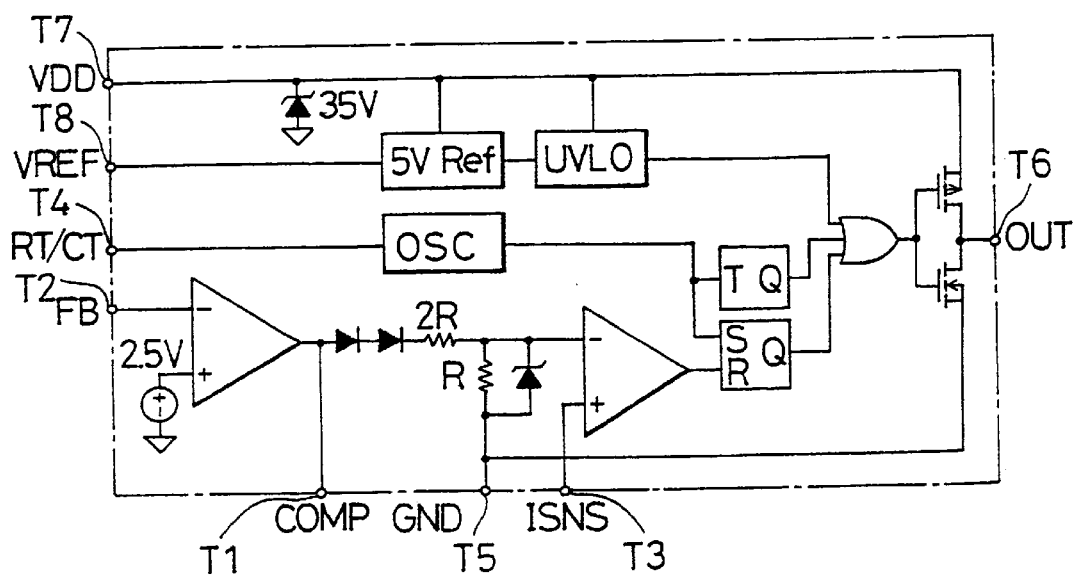
FIG. 4 is a block circuit diagram showing an example of the internal configuration of a pulse width control circuit IC1.
Figure 5:
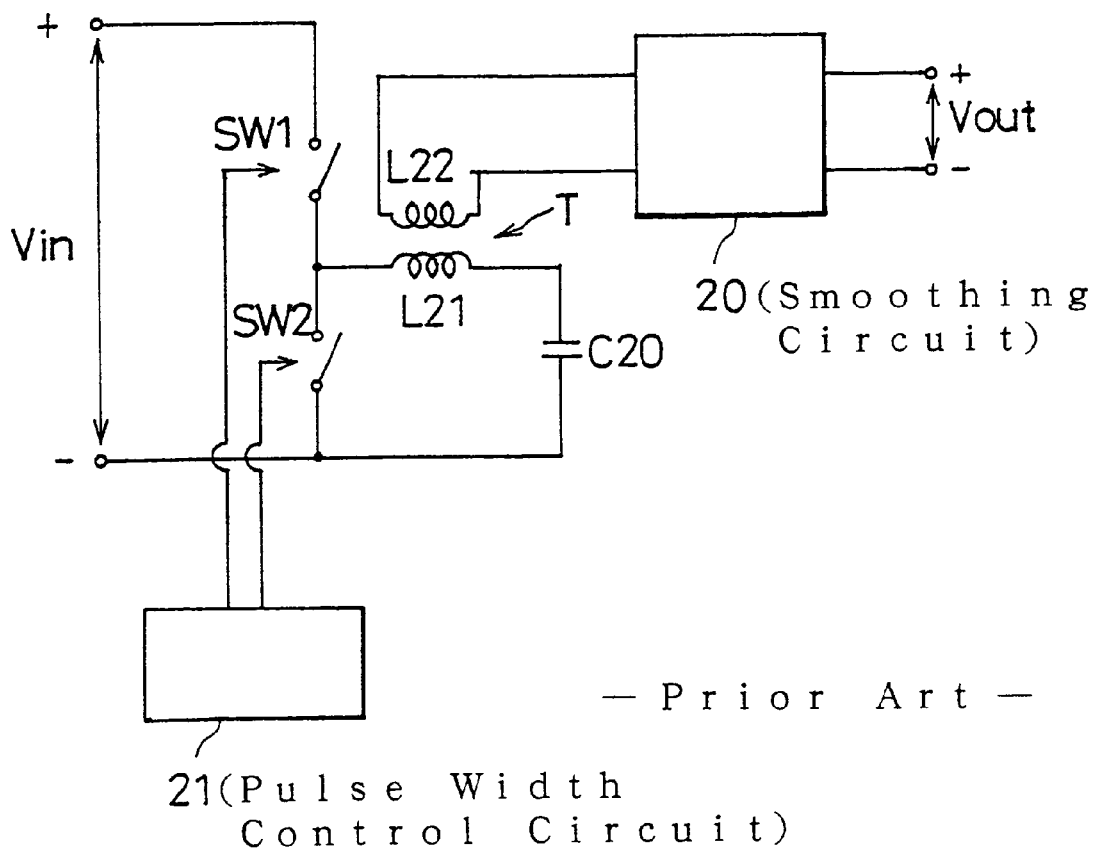
FIG. 5 is a block circuit diagram showing a configuration of the switching regulator using the conventional half bridge pulse control system.

In FIG. 4, there is shown a specific example of the pulse width control circuit IC1. In the figure, there is shown an internal configuration of Mycrel supplied MIC38C45 mentioned above. Terminals T1 to T8 in FIG. 4 correspond to terminals T1 to T8 in FIG. 1. A detection current at the light detecting transistor PT is connected to the terminals T1 and T2 of the pulse width control circuit IC1. Then the current is compared with a detection current for over-current protection inputted from the terminal T3 via an error amplifier for comparing it with a predetermined reference voltage 2.5 volts. Thereafter, PWM control signal having a duty of 50% or less is outputted from the terminal T6 that is an output end. Consequently, in the case where a voltage that corresponds to a detection current at the light emitting diode PD and that is a feedback signal to the light detecting transistor PT is lower in comparison with a reference voltage, a greater pulse width of the PWM control signal is generated. On the contrary, in the case where the voltage is higher, the smaller pulse width of the PWM control signal is generated.

In FIG. 1, there is shown a shunt regulator DZ that has a constant voltage regulator circuit using a Zenar diode. Further, there may be employed a shunt regulator for stabilizing an output voltage with high precision that detects an output voltage and an output current using a plurality of differential amplifier and returns the result to the pulse width control circuit IC1 using the photocoupler.

It is of course that transistor conducting type, diode orientation, and signal polarity of each portion used in the foregoing description may be inverted with those indicated.

As has been described above, in a switching regulator using the pulse width modulation controlled fly-back system, there are provided advantages in that:

a first directional delay circuit generates a first pulse signal in which a pulse rise of the pulse width modulation control signal is delayed for a predetermined period;

a second directional delay circuit generates a second pulse signal inverted after delaying a pulse fall of the pulse width modulation signal for a predetermined period;

the first pulse signal is used as a switching control signal with respect to the first switch in fly-back, and the second pulse signal is used as a switching control signal with respect to the second switch in fly-back;

therefore energy transmission to the rectifying circuit is performed except for said predetermined period;

the continuity of a rectified wave is good;

even if values of the inductor and the capacitor of the smoothing circuit are not increased, ripples can be decreased extremely, resulting in accelerated miniaturization of the switching regulator; and because said predetermined period is short, a switching loss is reduced, efficiency is improved, and noise generation can be restrained.

What is claimed is:

1. A pulse width modulation controlled switching regulator having a first switch and a second switch connected in series between input voltage terminals, connecting a series connection of a primary coil of a voltage conversion transformer and a capacitor in parallel to said second switch, performing alternating ON/OFF switching control of said first switch and said second switch in accordance with a pulse width modulation control signal, constantly supplying an output voltage smoothened via a secondary coil of a voltage conversion transformer, said switching regulator comprising:

a first directional delay circuit that generates a first pulse signal in which a pulse rise of said pulse width modulation control signal is delayed for a first predetermined period; and a second directional delay circuit that generates a second pulse signal in which a pulse fall of said pulse width modulation control signal is delayed for a second predetermined period and inverted, said first pulse signal being a switching control signal for said first switch, and said second pulse signal being a switching control signal for said second switch, wherein said first directional delay circuit has:

a first diode that inhibits conduction in a rising direction of said pulse width modulation control signal; and a first delay circuit connected in parallel to said first diode that delays a pulse rise of said pulse width modulation control signal for said first predetermined period; and wherein said second directional delay circuit has:
a second diode that inhibits conduction in a falling direction of said pulse width modulation control signal;
a second delay circuit connected in parallel to said second diode that delays a pulse fall of said pulse width modulation control signal for said second predetermined period; and
an inverting circuit that inverts a signal outputted from a parallel connection of said second diode and said second delay circuit.

2. A switching regulator as claimed in claim 1, wherein said first delay circuit has a first wave shaping circuit for shaping the pulse width modulation control signal to a rectangular pulse signal whose rising edge is delayed for a predetermined period from said pulse rise point to a point whose voltage level corresponds to a predetermined voltage of a signal delayed along with said pulse rise by CR time constant, and wherein said second delay circuit has a second wave shaping circuit for shaping the pulse width modulation control signal to a rectangular pulse signal whose falling edge is delayed for a predetermined period from said pulse fall point to a point whose voltage level corresponds to a predetermined voltage of a signal delayed along with said pulse fall by CR time constant.

3. A pulse width modulation controlled switching regulator having a first switch and a second switch connected in series between input voltage terminals, connecting a series connection of a primary coil of a voltage conversion transformer and a capacitor in parallel to said second switch, performing alternating ON/OFF switching control of said first switch and said second switch in accordance with a pulse width modulation control signal, constantly supplying an output voltage smoothened via a secondary coil of a voltage conversion transformer, said switching regulator comprising:

a first directional delay circuit that generates a first pulse signal in which a pulse rise of said pulse width modulation control signal is delayed for a first predetermined period; and a second directional delay circuit that generates a second pulse signal in which a pulse fall of said pulse width modulation control signal is delayed for a second predetermined period and inverted, said first pulse signal being a switching control signal for said first switch, and said second pulse signal being a switching control signal for said second switch, wherein said first predetermined period and said second predetermined period comprise a period wherein a rise and a fall of a signal in said first switch, based on said first pulse signal, and a rise and a fall of a signal in said second switch, based on said second pulse signal, do not mutually overlap in consideration of pulse wave rounding.

4. A pulse width modulation controlled switching regulator having a first switch and a second switch connected in series between input voltage terminals, connecting a series connection of a primary coil of a voltage conversion transformer and a capacitor in parallel to said second switch, performing alternating ON/OFF switching control of said first switch and said second switch in accordance with a pulse width modulation control signal, constantly supplying an output voltage smoothened via a secondary coil of a voltage conversion transformer, said switching regulator comprising:

a first directional delay circuit that generates a first pulse signal in which a pulse rise of said pulse width modulation control signal is delayed for a first predetermined period; and a second directional delay circuit that generates a second pulse signal in which a pulse fall of said pulse width modulation control signal is delayed for a second predetermined period and inverted, said first pulse signal being a switching control signal for said first switch, and said second pulse signal being a switching control signal for said second switch.

5. A switching regulator as claimed in claim 4, wherein said pulse width modulation control signal has a duty cycle of 50% or less.

6. The switching regulator of claim 4, wherein said pulse width modulation control signal has a duty cycle of not more than approximately 50 percent.

\* \* \* \* \*